3,013,103
SHIELDED ENCLOSURE
Eugene D. Pettler, 6828 Lasaine, Van Nuys, Calif., and Alexander M. Intrator, 127 Doll Parkway, Syracuse, N.Y.
Filed Dec. 23, 1959, Ser. No. 861,728
2 Claims. (Cl. 174—35)
(Granted under Title 35, U.S. Code (1952), sec. 266)

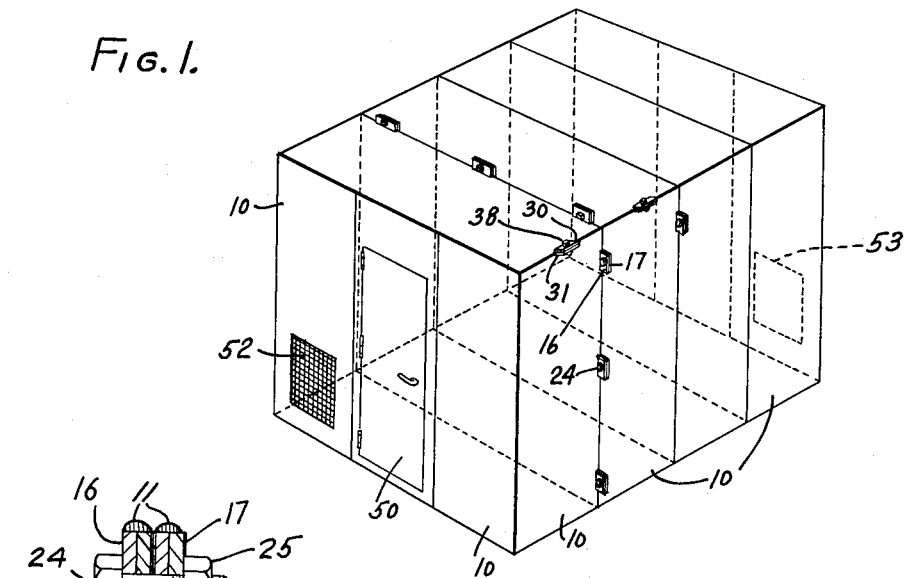
Fig. 1.
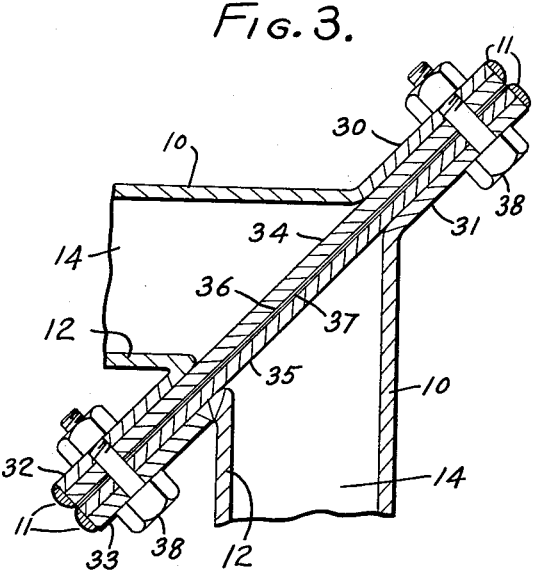
Fig. 3.
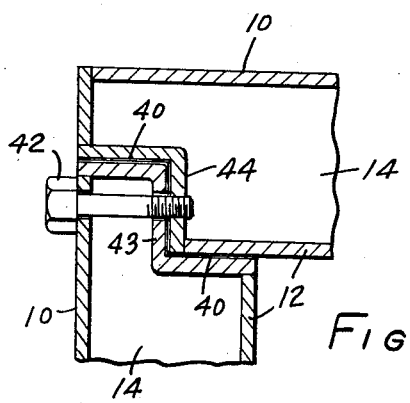
Fig. 2.
Fig. 4.
INVENTORS
EUGENE D. PETTLER
BY ALEXANDER M. INTRATOR
W Glenn Jones
ATTORNEY United States Patent Office 3,013,103
Patented Dec. 12, 1961

The invention described herein may be manufactured and used by or for the Government of the United States of America for governmental purposes without the payment of any royalties thereon or therefor.

This invention relates to a knock-down type of enclosure or room shielded against radio-frequency disturbance, so that low-level electrical or other sensitive electronic measurements can be made therein.

In one form of the invention, the walls of the enclosure are formed by spaced walls of cold rolled steel with their opposed surfaces coated with copper so that when they are drawn together under pressure a good electrical contact results.

An object of the invention is to provide a shielded enclosure which can be easily transported in knocked-down condition, and readily set up at the new location.

A further object is to provide an enclosure of such construction as to provide some degree of insulation against heat or noise.

Further objects and many of the attendant advantages of this invention will be readily appreciated as the same becomes better understood by reference to the following description.

FIG. 1 is a schematic perspective view of an enclosure embodying the invention;

FIG. 2 is an enlarged cross-sectional view of a wall joint;

FIG. 3 is a similar view showing one form of corner joint; and

FIG. 4 is a similar view showing an alternate form of corner joint.

The structure shown in FIG. 1 comprises four vertical walls plus ceiling and floor, each made up of a plurality of panels. As seen in FIGS. 2 and 3, each of the panels is formed of an outer plate 10 and an inner plate 12 spaced from each other to form a heat and sound insulating space 14 therebetween. Where the plates meet other than at a corner they are joined together by means of the joint shown in FIG. 2, which comprises outturned flanges 16, 17 on the outer plates and inturned flanges 18, 19 on the inner plates, reinforced by opposed strips 20, 21 which may be welded to the flanges as shown at 11. The plates and strips are preferably formed of cold rolled steel sufficiently heavy to give the desired structural strength required in the structure, and the strips are coated on their contiguous surfaces with sprayed copper coatings 22, 23 of such thickness as to insure good electrical contact at the joint. The joint is held separably together by bolts 24 which pass through holes in the flanges and are provided with nuts 25.

The joints at the corners (FIG. 3) are similar except that the outturned flanges 30, 31 on the outer plates and the inturned flanges 32, 33 on the inner plates are beveled as shown to bisect the corner angle. The strips 34, 35, coatings 36, 37 and bolts 38 function like the corresponding elements in FIG. 2.

The corner joint shown in FIG. 4 is of the stepped type, with one or both members provided at their contiguous surfaces with a copper coating 40. A bolt 42 passes freely through walls 10 and 43 and threadedly engages stepped wall 44 of the second panel member, so that the joint may be drawn tight.

Referring to FIG. 1, it will be noted that one of the vertical panels is provided with a door 50 of any suitable construction, while waveguide filters 52, 53 are provided in two of the other panels.

The metallized-copper edging on the panels forms a rough and relatively soft surface which when the panels are bolted together crushes slightly. This is turn gives rise to a number of localized "wiping actions" between the irregularities on the mating panel surfaces and results in a low impedance or high conductivity joint between the respective panels. The large contact area at the joints further insures the high joint conductivity and minimizes the possibility of leakage of energy through the joint because of localized joint corrosion. The unitized panel construction permits easy assembly with bolts and nuts without the necessity of erecting a separate wall framework as had been required by previous construction methods.

The unit described herein offers several advantages over the types previously built. The use of steel as the primary shielding medium obviates the need for extensive use of sheet copper which is more expensive and more critical in supply. This combined with the design of the panels results in a less expensive shielded room. Higher shielding performance, in excess of 120 db attenuation, is achieved over a wider frequency range than can be offered by present screen or solid wall knock-down type shielded rooms. The metallized copper end sections of the panels provide a positive low impedance electrical contact at the joints between the assembled panels. The exclusive use of metal throughout eliminates the shrinkage problem and termite control problems that exist with wood frame structures.

Obviously many modifications and variations of the present invention are possible in the light of the above teachings. It is therefore to be understood that within the scope of the appended claims the invention may be practiced otherwise than as specifically described.

What is claimed is:

1. A knockdown structure for shielding against electromagnetic waves, comprising a plurality of steel plates arranged in spaced pairs to form double walls, and means for detachably securing said plates together in electrically conductive relation, comprising outwardly and inwardly extending parallel flanges on said plates, mating strips permanently secured and electrically bonded to said flanges, the opposed surfaces of said mating strips being provided with copper spray coating, and releasable means for drawing said surfaces together under pressure to form an electrical connection between the several steel plates.

2. The invention defined in claim 1, comprising in addition corner joints formed with outwardly and inwardly extending parallel diagonal flanges on said plates, mating strips secured and electrically bonded to said flanges, the opposed surfaces of said mating strips being provided with copper spray coating, and releasable means for drawing said surfaces together under pressure to form an electrical connection between the several steel plates.

References Cited in the file of this patent
UNITED STATES PATENTS
2,211,644    Buck et al. _____ Aug. 13, 1940

OTHER REFERENCES
Publication I, "Using Sheet Steel in Construction of Shielded Room (Intrator), published in Electrical Engineering, September 1953 (page 809 relied on).